US012790245B2

(12) United States Patent
Skorobogatov et al.

(10) Patent No.: US 12,790,245 B2
(45) Date of Patent: Nov. 10, 2026

(54) WASTE WATER TREATMENT SYSTEM

(71) Applicant: MAGNA Engineering Services Inc., Calgary (CA)

(72) Inventors: Anton Skorobogatov, Calgary (CA); Jennifer Christine Massig, Calgary (CA)

(73) Assignee: MAGNA INTELLECTUAL PROPERTY LTD., Calgary (CA)

( * ) Notice: Subject to any disclaimer, the term of this patent is extended or adjusted under 35 U.S.C. 154(b) by 343 days.

(21) Appl. No.: 18/371,930

(22) Filed: Sep. 22, 2023

(65) Prior Publication Data

US 2024/0101455 A1 Mar. 28, 2024

Related U.S. Application Data

(60) Provisional application No. 63/409,192, filed on Sep. 22, 2022.

(51) Int. Cl.
*C02F 3/32* (2023.01)

(52) U.S. Cl.
CPC ........ *C02F 3/327* (2013.01); *C02F 2203/006* (2013.01)

(58) Field of Classification Search
CPC .... C02F 3/327; C02F 2203/006; C02F 3/104; C02F 2301/043; Y02W 10/10
See application file for complete search history.

(56) References Cited

U.S. PATENT DOCUMENTS

| | | | | |
|---|---|---|---|---|
| 5,863,433 | A | 1/1999 | Behrends | |
| 9,221,698 | B2 | 12/2015 | Kim et al. | |
| 2016/0326032 | A1* | 11/2016 | Kent | C02F 3/327 |

OTHER PUBLICATIONS

Dotro et al., 2017, Biological Wastewater Treatment Series. Volume 7: Treatment Wetlands.

* cited by examiner

*Primary Examiner* — In Suk C Bullock
(74) *Attorney, Agent, or Firm* — MBM Intellectual Property Law LLP

(57) ABSTRACT

An object of the present invention is to provide an improved vertical flow biofilter comprising a vertical filter bed system comprising a liquid permeable distribution layer, a liquid permeable treatment bed and a liquid permeable transition layer, wherein the permeability of the distribution and drainage layers being higher than the permeability of the treatment media bed. The biofilter system also comprises at least one bypass conduit extending vertically through the distribution layer and the treatment bed to terminate at the transition layer. A first open end of the at least one bypass conduit being substantially flush with the top surface of the distribution layer and a second open end extends to the bottom surface of the treatment bed. The bypass conduit being made of a liquid impermeable material and containing a permeable media having permeability higher than the permeability of the treatment media.

18 Claims, 2 Drawing Sheets

WASTE WATER TREATMENT SYSTEM

CROSS-REFERENCE TO RELATED APPLICATIONS

This application claims the benefit and priority of U.S. Provisional Application 63/409,192, filed Sep. 22, 2022. The foregoing application is incorporated by reference herein in its entirety.

FIELD OF THE INVENTION

The present invention relates, in general, to water treatment systems. More particularly, the present invention relates to a biofilter system useful in wetland water purification system.

BACKGROUND

The treatment of wastewater/effluent has been a challenge since the beginning of civilization. Human waste and effluent are a vector for pathogens and disease and are problematic unless properly managed. The approaches for this management vary from dumping the material in a remote location to managed technological treatment facilities commonly referred to as mechanical wastewater treatment plants.

Dumping untreated waste is problematic because human effluent is a vector for disease and raw sewage causes deleterious impacts on the environment. Mechanical wastewater treatment plants have become the standard means of wastewater treatment in most urban settings because they offer sufficient treatment of effluent before it is released to the environment. These treatment facilities generally use a prescribed sequence of physical and chemical treatment steps that remove contaminants out of the effluent. The facilities are engineered systems consisting of fluid holding tanks, pumping systems, valves and controlling means, and measurement systems. A trained operator monitors the performance of the system and makes adjustments to the processes in order to maintain the quality of the treated wastewater.

Wastewater treatment facilities typically run well and provide adequate treatment of the effluent. However, due to their complexity, these facilities require substantial operational and maintenance efforts and cost, which cannot be sustained by most small municipalities. Additionally, these facilities require the employment of at least one qualified technician to operate them which can be an extra unwanted expense for a small community.

An alternative to the mechanical wastewater treatment plant for a small community is a wastewater treatment lagoon. A lagoon is simply a basin or a series of basins of a size that is calculated as being large enough to hold a prescribed amount of wastewater for a prescribed amount of time, given a predicted input rate. Treated effluent is released from the lagoon continuously or seasonally and biological activity in the lagoon removes contaminants from the water over time and solids settle to the bottom, leaving relatively clear water to be released into the environment.

In many cases a community would desire that wastewater be treated to a higher quality than a lagoon can provide but the community is unable to bear the complexity and expense of a mechanical wastewater treatment plant. In such cases wastewater treatment wetlands may be a suitable alternative. Wastewater treatment wetlands can be designed as free-water surface or subsurface flow types.

The subsurface wastewater treatment wetlands have been shown to be effective and require less space than free-water surface flow wetlands. Subsurface flow treatment wetlands are engineered systems that consist of a waterproof layer, means of applying effluent to be treated, granular media, vegetation, and means of releasing effluent once treated.

Many different designs of subsurface wetlands exist, where the design elements depend on the specific treatment objectives, available space, environmental conditions, and budget constraints. Each design has its own advantages and limitations, and they can be adapted to address various water quantity, quality, and environmental goals. Most subsurface wetland designs are intended for warm or temperate climates, where the risks of freezing are low. There is a need for design adaptations that are uniquely suited to withstand the challenges associated with freezing conditions.

A two-step wetland system with both vertical and horizontal flow components can provide a versatile and effective approach for wastewater treatment, particularly in settings where additional complexities exist, such as cold climate considerations, stringent nutrient removal targets, or spatial limitations. Such systems offer the advantage of combining the strengths of different wetland types to achieve comprehensive pollutant removal.

In the first stage of a two-step wetland system, wastewater is introduced at the surface of a bed of permeable media, typically consisting of gravel and/or sand. The wastewater flows vertically downward through this media. As it percolates through the media, physical, chemical, and biological processes occur, leading to the removal of contaminants. In the second stage, the partially treated effluent from the vertical flow wetland flows horizontally through another bed of permeable media, which can be similar in composition to the first stage. This stage provides additional treatment, particularly for nutrients and remaining contaminants, resulting in further improvement of water quality.

Of the two stages, the first one is subject to greater risk of failure and potential need for maintenance intervention. The sand layer in a bed of permeable media poses the greatest risk of clogging, which could jeopardize the performance of the entire two-step system. Consequently, design of the first stage of the system is critical to the overall system performance and functionality.

The "clogging" of the sand layer of the constructed wetland systems with an accumulation of bacteria and excess organic matter can result in the flooding of the surface of the vertical flow filter and water saturation of the sand layer which can cause the filter to become ineffective, leading to hydraulic failure of the system and subsequent costly media replacement. As a result these very effective means of dealing with wastewater are not in use as much as they could be.

Therefore there is a need for improving of the vertical flow biofilter systems to mitigate problems associated with clogging of the sand layer.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an improved vertical flow biofilter and a wastewater treatment system incorporating same.

In accordance with an aspect of the present invention, there is provided a wastewater treatment system comprising a vertical flow biofilter system, vertical flow biofilter system comprising: a). a vertical filter bed system comprising: a liquid impermeable housing having a floor and one or more side walls, a liquid permeable transition layer comprising a filter media, provided on the floor, a liquid permeable treatment bed comprising a treatment media, provided over the transition layer, the treatment bed having a top surface and a bottom surface, and a liquid permeable distribution layer comprising a filter media, provided over the top surface of the treatment media bed, the permeability of the distribution and transition layers being higher than the permeability of the treatment media bed; b). at least one inflow conduit for delivering influent wastewater at a top surface of the distribution layer; c). at least one liquid perforated outflow conduit extending horizontally below a bottom surface of the transition layer for collecting treated wastewater after passage through the treatment bed and the transition layer, and draining the treated waste water out of the housing; d). at least one bypass conduit having a first open end and a second open end, the bypass conduit extending vertically through the distribution layer, and the treatment bed to terminate at the transition layer, the first open end of the at least one bypass conduit being substantially flush with the top surface of the distribution layer and the second open end extending to the bottom surface of the treatment bed, the bypass conduit being made of a liquid impermeable material and containing a permeable media having permeability higher than the permeability of the treatment media.

BRIEF DESCRIPTION OF THE FIGURES

Further features and advantages of the present disclosure will become apparent from the following detailed description, taken in combination with the appended drawings, in which.

DETAILED DESCRIPTION OF THE INVENTION

Figure 1:
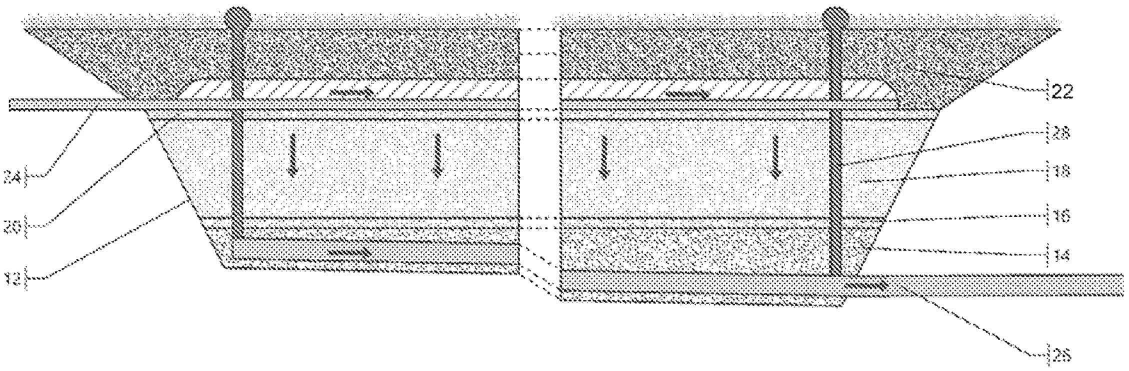
Prior Art FIG. 1
FIG. 1 is a cross-sectional view of a conventional vertical flow biofilter system known in the art.

Unless defined otherwise, all technical and scientific terms used herein have the same meaning as commonly understood by one of ordinary skill in the art to which this invention belongs.

Unless the context requires otherwise, throughout this specification and claims, the words "comprise", "comprising" and the like are to be construed in an open, inclusive sense.

The articles "a" and "an" are used herein to refer to one or to more than one (i.e., to at least one) of the grammatical object of the article. By way of example, "an element" means one element or more than one element.

As used herein, the term "about" refers to approximately a +/−10% variation from a given value. It is to be understood that such a variation is always included in any given value provided herein, whether or not it is specifically referred to.

The term "filtration/filter media" as defined herein refers to a relatively coarse granular material. The filtration media can be made of porous or non-porous material. The filtration media may or may not allow formation and growth of biofilm by microorganisms. Non-limiting examples of filter media include pea gravel, river gravel, washed gravel, river rock, crushed stone, etc.

The term "treatment media" as used herein refers to a natural and/or engineered material which allows for formation and growth of biofilm by microorganisms to provide physical, chemical and biological filtration of the wastewater. The treatment media can be made of granular material, which can be porous or non-porous material. Non-limiting examples of suitable treatment media include sand, perlite, expanded aggregate, soil, compost, zeolite, activated charcoal, iron oxide, aluminum oxide, bio balls, stonewool, rockwool, etc.

The present invention provides an improved vertical flow biofilter and biofilter system, for wastewater treatment systems such as constructed/artificial wetland water purification systems. The vertical flow biofilter of the present invention allows for periodic rejuvenation of the treatment layer with minimal or no supervision or manual operation.

The vertical flow biofilter system of the present invention comprises a vertical filter bed system, at least one inflow conduit, at least one outflow conduit, and at least one bypass conduit.

The vertical filter bed system comprises a liquid impermeable housing having a floor and one or more side walls. The housing comprises a liquid permeable transition layer comprising a filter media provided on the floor of the housing, a liquid permeable treatment bed comprising a treatment media provided over the transition layer, and a liquid permeable distribution layer comprising a filter media provided over a top surface of the treatment media bed. The permeability of the distribution and transition layers are higher than the permeability of the treatment media bed.

The least one inflow conduit is configured for delivering influent wastewater at a top surface of the distribution layer. The at least one outflow conduit extends horizontally below a bottom surface of the transition layer, and is provided with perforations for collecting treated wastewater after passage through the treatment bed and the transition layer, and draining same out of the housing.

The at least one bypass conduit has a first open end and a second open end. The bypass conduit extends vertically through the distribution layer and the treatment bed to terminate at the transition layer. The first open end of the at least one bypass conduit is substantially flush with the top surface of the distribution layer and the second open end extends to the bottom surface of the treatment bed. The bypass conduit is made of a liquid impermeable material and contains a permeable media having permeability higher than the permeability of the treatment media. The permeable material within the bypass conduit has greater hydraulic conductivity than that of the surrounding media.

The permeable material in the bypass conduit can be a filtration material, such as pea gravel, river gravel, washed gravel, river rock, crushed stone, etc.

Non-limiting examples of impermeable material suitable for the bypass conduit include plastic, metal and concrete.

In some embodiments, the bypass conduit is provided with removal cover member, which is removed when clogging is suspected.

In some embodiments, the vertical flow biofilter system comprises a drainage layer placed below the transition layer.

The particle sizes of the materials suitable for use in the permeable distribution layer, the treatment bed, the transition layer, the drainage layer and the permeable material within the bypass conduit can be determined using Terzaghi rule to avoid the migration of finer material layers to the coarser material layers below. The Terzaghi rule states that $D_{15}m/d_{85}$ ratio be less than 4 (where D corresponds to the finer upper layer and d to the lower coarser layer) (Dotro et al., 2017, *Biological Wastewater Treatment Series. Volume* 7: *Treatment Wetlands*.).

In some embodiments, the material of the treatment layer has a mean particle size of about 1-4 mm, the material of the distribution layer has a mean particle size of about 8-16 mm, and the granular material of the transition layer has a mean particle size of about 4-8 mm.

In some embodiments, the treatment media comprises sand, and the distribution and the transition layers comprise pea gravel.

In some embodiments, the permeable material within the bypass conduit is gravel.

The treatment media bed can have a depth of more than 50 cm and up to 2 meter, the transition layer can have a thickness of about 5 to 10 cm, and the distribution layer can have a thickness of about 5 to 10 cm.

In some embodiments, the drainage layer comprises coarse granular material, such as drain rocks. In some embodiments, the drainage layer has a thickness of about 10-20 cm.

In some embodiments, the vertical flow system comprises an impermeable liner provided below the transition layer, or the drainage layer if present. The liner can be made of a geotextile fabric, high density polymer and the like, and can have minimum thickness about 0.5 mm.

In some embodiments, the vertical flow system comprises a protective layer over the top surface of the distribution layer. The protective layer can comprise materials such as coarse gravel, wood chips, seashells, etc., that provide a barrier against human contact with wastewater as well as thermal insulation. The protective layer has a thickness of at least about 0.2 m.

The bulk of microbial activity occurs in the treatment bed. The transition layer prevents the migration of the media from the treatment bed to the drainage layer or the bottom of the housing.

In the embodiments comprising a protective layer, the inflow conduits can be positioned below or embedded in the protective layer.

In the vertical flow biofilter of the present invention, the placement of the first open end of the bypass conduit substantially flush with the top surface of the distribution layer ensures that, if the treatment media is draining slowly enough that wastewater accumulates above the distribution layer, the extra wastewater would be diverted through the bypass conduit to the transition layer. This diversion can reduce the load on the treatment media, allowing the biological clogging to clear so that the filter can operate properly once again.

In some embodiments, at least one outflow conduit has one end protruding upwardly from the distribution layer to allow intake of atmospheric air, and/or the system comprises at least one vertically oriented air intake conduit having one end connected to the outflow conduit and second end protruding upwardly from the distribution layer to allow intake of atmospheric air.

In some embodiments, the second end of the air intake conduit is connected to a passive aeration device, such as a wind turbine. Such devices are powered by wind and act to create a suction in the transition and/or drainage layer, drawing air from the surface into the vertical flow biofilter and help in draining the treated wastewater out of the vertical flow biofilter.

There are multiple ways known in the art of delivering influent wastewater to the surface of vertical flow biofilter system. Proper distribution of the influent wastewater is essential to ensure uniform distribution, maximize treatment efficiency, and prevent issues like organic or hydraulic overload or uneven flow patterns.

In some embodiments, the at least one inflow conduit is perforated and extends over the top surface of the distribution layer (also referred to as perforated lateral).

In some embodiments, the system comprises an evenly distributed network of perforated laterals.

In some embodiments, the system comprises a plurality of spaced apart perforated laterals extending horizontally over the top surface of the distribution layer.

In some embodiments, the perforated laterals are covered by one or more open bottom chamber/housings, also referred to as infiltration chamber(s).

The bypass conduits of the present invention are positioned such that the open top ends of the bypass conduits are positioned in the spaces between the adjacent laterals.

The laterals are designed to deliver influent wastewater at rates that exceed hydraulic capacity of the treatment media (e.g. sand layer), which creates subsurface ponding above the treatment media with every influent wastewater application. This ponding facilitates even hydraulic distribution of influent wastewater across the filter system bed, preventing issues like channelling and ensuring uniform flow through the treatment media. It also facilitates beneficial air entry into the media.

The vertical flow system can be placed below ground, flush with the ground or at any level above ground. In a system that is placed flush with ground level, the system further comprises various types of plants, trees or shrubs plate at the top surface.

In some embodiments, the vertical flow biofilter system is a wetland subsurface system, wherein the housing is defined by a subsurface basin in the ground.

The vegetation planted in the top layer of the vertical flow biofilter system is allowed to develop deep, wide roots, which permeate the treatment media. The vegetation transfers a small amount of oxygen to the root zone so that aerobic bacteria can colonize the area and degrade organics. However, the primary role of vegetation is to maintain permeability in the treatment media and provide habitat for microorganisms. Nutrients and organic material are absorbed and degraded by the dense microbial populations. By forcing the organisms into a starvation phase between dosing phases, excessive biomass growth can be decreased and porosity increased.

In some embodiments, the wastewater treatment system of the present invention is a two stateg system further comprising a horizontal flow biofilter system connected to the vertical flow biofilter system. The horizontal flow biofilter system comprises a horizontal filter bed system comprised of a water impermeable housing having a floor and one or more side walls, a permeable distribution layer, a permeable treatment bed comprising a treatment media bed, and a permeable drainage layer being provided sequentially from a side wall to an opposite side wall of the housing.

The horizontal flow biofilter system also comprises at least one inlet opening in the side wall adjacent the distribution layer to receive the treated wastewater from the outflow conduit of the vertical flow biofilter system to induce a horizontal flow thereof through the treatment media bed; and at least one outflow conduit extending horizontally at a lower portion of the drainage layer for draining further treated wastewater out from the treatment system.

In some embodiments, the outflow conduit of the horizontal flow biofilter system is connected to a recycle conduit and a disposal conduit, wherein the recycle conduit recirculates at least a portion of the treated wastewater and bypassed wastewater collected from the horizontal flow system to the inflow conduit of the vertical flow system.

In some embodiments, the horizontal flow biofilter system is a wetland subsurface system, wherein the housing is defined by a subsurface basin in the ground.

In the two-stage treatment system of the present invention, wastewater is delivered to the top surface of the distribution layer of the vertical flow biofilter system via perforated laterals. The distribution layer allows the wastewater to distribute evenly before it seeps slowly down through the treatment bed before collecting below at the transition layer and/or the drainage layer. Treatment generally occurs within the treatment bed where biofilm forms on the treatment media and the associated microorganisms digest contaminants present in the wastewater. The treatment processes within the biofilm require oxygen to ensure sufficient contaminant breakdown. To facilitate this, the wastewater is introduced to the vertical flow filter in intermittent doses and the filter is allowed to drain between these intervals. The draining enables passive aeration, which allows oxygen to flow into the sand.

For a two-stage system, once wastewater exits the vertical flow filter it is directed to a horizontal flow biofilter system. The transition between the two can be done by gravity or through pumping. The horizontal flow wetland also provides biological treatment to the wastewater. In this case though, the treatment and digestion of the organic matter is anaerobic in nature and thus the horizontal flow filter may remain fully saturated. With the two-stage system, a complete nitrogen breakdown is anticipated.

As the wastewater that is diverted through the bypass conduit is not cleaned as well as it would be if it had gone through the sand layer, after passing the water drained out from the vertical flow filter system through the horizontal flow system, the water may be recirculated through the vertical flow filter system which would still have some filtering capacity. Using this method, wastewater can reliably be cleaned to a high level while using a nature-based treatment means that is resilient and reliable.

To gain a better understanding of the invention described herein, the following examples are set forth with reference to the accompanying drawings, which are not drawn to scale, and the illustrated components are not necessarily drawn proportionately to one another. It will be understood that these examples are intended to describe illustrative embodiments of the invention and are not intended to limit the scope of the invention in any way.

EXAMPLES

FIG. 1 is a cross-sectional view of a convention vertical flow biofilter system formed in a wetland basin. The system comprises a water impermeable wetland basin 12 having a drainage layer 14 made of drain rock at the bottom, topped by a transition layer 16 made of pea gravel, topped by a sand bed 18, topped by a permeable distribution layer 20 made of pea gravel, topped by a protective layer 22 made of mulch. At least one perforated inflow conduit 24 embedded in the protective layer and extends horizontally over the top surface of the distribution layer 20, and at least one perforated outflow conduit 26 extends horizontally in the drainage layer. The system can further include at least one vertically oriented air intake conduit 28 connected to the outflow conduit.

Figure 2:
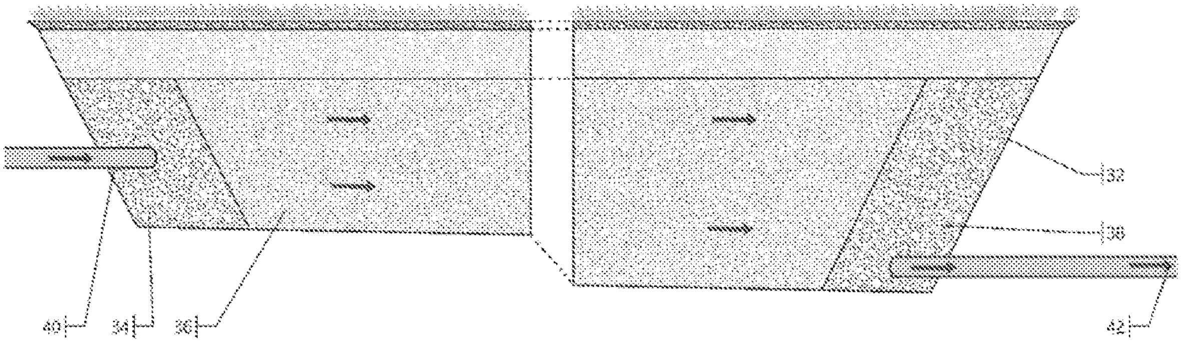
Prior Art FIG. 2
FIG. 2 is a cross-sectional view of a conventional horizontal flow biofilter system known in the art.

FIG. 2 is a cross-sectional view of a convention horizontal flow biofilter system formed in a wetland basin. The system comprises a water impermeable wetland basin 32 having a permeable distribution layer 34, a permeable treatment bed 36, and a permeable drainage layer 38, being provided sequentially from a side wall to an opposite side wall of the basin. The basin has an inlet opening 40 in the side wall adjacent the distribution layer to receive the treated and bypassed waste water from the outflow conduit of the vertical flow biofilter system to induce a horizontal flow through the treatment media bed. An outflow conduit 42 extends horizontally at a lower portion of the drainage layer for draining further treated waste water out from the system.

Figure 3:
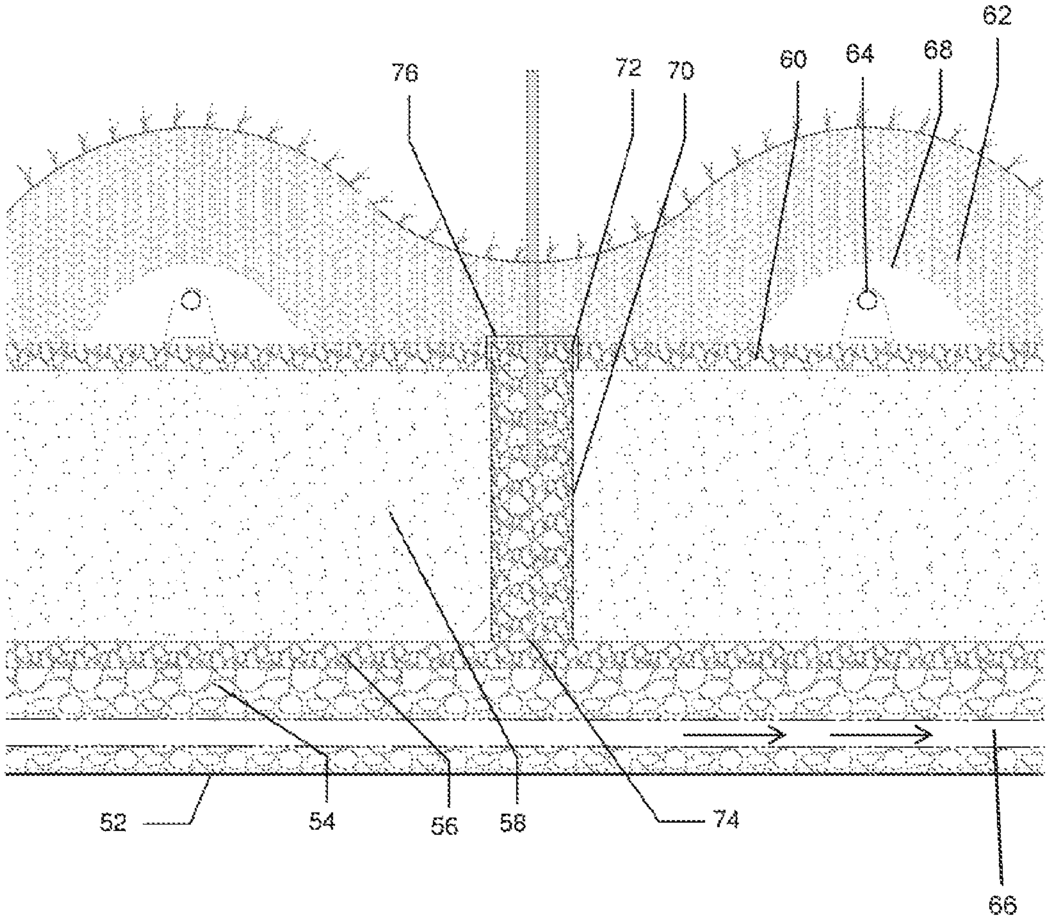
FIG. 3 is a cross-sectional view of the vertical flow biofilter system, in accordance with an embodiment of the present invention.

FIG. 3 depicts an exemplary vertical flow biofilter system of the present invention as part of a constructed wasteland treatment system. The biofilter system comprises a drainage layer 54 provided at the floor 52 of a basin. The drainage layer is topped by a transition layer 56 made of pea gravel, topped by a sand bed 58, topped by a distribution layer 60 made of pea gravel, topped by a protective layer 62. At least one inflow conduit 64 (shown in cross section) which is perforated at least at the top wall, embedded in the protective layer and extends horizontally over the top surface of the distribution layer 60, and at least one perforated outflow conduit 66 extends horizontally in the drainage layer. The system is provided with a bypass conduit 70 made of a liquid impermeable material. The bypass conduit extends vertically through the distribution layer, the treatment bed and terminates at the transition layer. The first open end 72 of the bypass conduit is flush with the top surface of distribution layer 60 and the second open end 74 extends to the bottom surface of the treatment bed. The bypass conduit is provided with a removal cap 76, which is removed when clogging is suspected to allow the superfluous wastewater to be diverted through the bypass conduit to the transition layer. The at least one inflow conduit is protected with an open bottom infiltration chamber 68.

To gain a better understanding of the invention described herein, the following examples are set forth with reference to the accompanying drawings, which are not drawn to scale, and the illustrated components are not necessarily drawn proportionately to one another. It will be understood that these examples are intended to describe illustrative embodiments of the invention and are not intended to limit the scope of the invention in any way.

What is claimed is:

1. A wastewater treatment system comprising a vertical flow biofilter system, vertical flow biofilter system comprising:

- a. a vertical filter bed system comprising:
  - a liquid impermeable housing having a floor and one or more side walls,
  - a liquid permeable transition layer comprising a filter media, provided on the floor,
  - a liquid permeable treatment bed comprising a treatment media, provided over the transition layer, the treatment bed having a top surface and a bottom surface, and
  - a liquid permeable distribution layer comprising a filter media, provided over the top surface of the treatment media bed, the permeability of the distribution and transition layers being higher than the permeability of the treatment media bed;

b. at least one inflow conduit for delivering influent wastewater at a top surface of the distribution layer, c. at least one liquid perforated outflow conduit extending horizontally below a bottom surface of the transition layer for collecting treated wastewater after passage through the treatment bed and the transition layer, and draining the treated waste water out of the housing, d. at least one bypass conduit having a first open end and a second open end, the bypass conduit extending vertically through the distribution layer, and the treatment bed to terminate at the transition layer, the first open end of the at least one bypass conduit being substantially flush with the top surface of the distribution layer and the second open end extending to the bottom surface of the treatment bed, the bypass conduit being made of a liquid impermeable material and containing a permeable media having permeability higher than the permeability of the treatment media.

2. The treatment system of claim 1, further comprising a removable cover member configured to cover the first open end of the bypass conduit.

3. The treatment system of claim 1, further comprising an impermeable liner provided below the transition layer.

4. The treatment system of claim 1, further comprising a drainage layer comprising coarse granular material, placed below the transition layer.

5. The treatment system of claim 4, further comprising an impermeable liner provided below the drainage layer.

6. The treatment system of claim 1, further comprising a protective layer over the top surface of the distribution layer, wherein at least a portion of the inflow conduits are positioned below or embedded in the protective layer.

7. The treatment system of claim 1, wherein the treatment media comprises sand.

8. The treatment system of claim 1, wherein the distribution and transition layers comprise pea gravel.

9. The treatment system of claim 1, wherein the bypass conduit is made of plastic, metal or concrete, and contains gravel.

10. The treatment system of claim 1, further comprising at least one vertically oriented air intake conduit having one end connected to the outflow conduit and second end protruding upwardly from the distribution layer to allow intake of atmospheric air.

11. The treatment system of claim 10, wherein the second end of the air intake conduit is connected to a passive aeration device.

12. The treatment system of claim 1, wherein the at least one inflow conduit extends horizontally over the top surface of the distribution layer.

13. The treatment system of claim 1, wherein the housing is a wetlands subsurface basin.

14. The treatment system of claim 1, further comprising a horizontal flow biofilter system connected to the vertical flow biofilter system, wherein the horizontal flow biofilter system comprises:

a. a horizontal filter bed system comprising:

a water impermeable housing having a floor and one or more side walls, a permeable distribution layer, a permeable treatment bed comprising a treatment media bed, and a permeable drainage layer being provided sequentially from a side wall to an opposite side wall of the housing, b. at least one inlet opening in the side wall adjacent the distribution layer to receive the treated wastewater from the outflow conduit of the vertical flow biofilter system to induce a horizontal flow thereof through the treatment media bed; and c. at least one outflow conduit extending horizontally at a lower portion of the drainage layer for draining further treated wastewater out from the treatment system.

15. The treatment system of claim 14, wherein the outflow conduit of the horizontal flow biofilter system is connected to a recycle conduit and a disposal conduit, wherein the recycle conduit recirculates at least a portion of the treated wastewater and bypassed wastewater collected from the horizontal flow system to the inflow conduit of the vertical flow system.

16. The treatment system of claim 3, wherein the impermeable layer comprises geotextile fabric, or high density polymer.

17. The treatment system of claim 3, wherein the impermeable layer has minimum thickness 0.5 mm.

18. The treatment system of claim 4, wherein the coarse granular material comprises drain rocks.

* * * * *